United States Patent
Van Rosmalen

[19]

[11] Patent Number: 6,118,747
[45] Date of Patent: Sep. 12, 2000

[54] SCANNING DEVICE FOR OPTICAL DISCS

[75] Inventor: Gerard E. Van Rosmalen, Eindhoven, Netherlands

[73] Assignee: U.S. Philips Corporation, New York, N.Y.

[21] Appl. No.: 09/006,569

[22] Filed: Jan. 13, 1998

[30]     Foreign Application Priority Data

Jan. 30, 1997  [NL]  Netherlands ............... 97200254

[51] Int. Cl.⁷ ............................. G11B 7/00; G11B 17/30
[52] U.S. Cl. ..................................... 369/112; 369/219
[58] Field of Search ................................ 369/219, 112, 369/54, 58, 82, 44.32

[56]          References Cited

U.S. PATENT DOCUMENTS 5,687,154  11/1997  Tsuchiya et al. ............ 369/112
5,870,371   2/1999  Tsuchiya et al. ............ 369/112

FOREIGN PATENT DOCUMENTS

| 0464912 | 1/1992 | European Pat. Off. ...... G11B 7/08 |
| 0727776A1 | 8/1996 | European Pat. Off. . |
| 08315408A | 11/1996 | Japan . |
| 08315409A | 11/1996 | Japan . |
| 08329517A | 12/1996 | Japan . |

*Primary Examiner*—Stuart S. Levy
*Assistant Examiner*—Tod Kupstas
*Attorney, Agent, or Firm*—Michael E. Belk

[57]                ABSTRACT

A scanning device for an optical disc record carrier includes a turntable and a positioning device which is movable relative to the turntable in a plane transverse to the axis of rotation thereof. The positioning device includes a radiation source unit and an actuator unit having a carrier which supports several different objective lenses and which is movable parallel to the access of rotation. The scanning device further includes actuating apparatus for moving the actuator unit and the radiation source unit relative to one another between discrete operating positions in at least the plane transverse to the axis of rotation, so as to place a respective lens in position for scanning a respective one of several different types of optical discs having mutually different substrate thicknesses and/or information densities.

11 Claims, 3 Drawing Sheets

SCANNING DEVICE FOR OPTICAL DISCS

BACKGROUND OF THE INVENTION

1. Field of the Invention

The invention relates to a scanning device comprising a turntable for supporting a disc-shaped recording medium, which turntable is rotatable about an axis of rotation, and further comprising a radiation source and a positioning device which is operable with respect to the turntable in a plane which is oriented at least substantially transversely to the axis of rotation, which positioning device comprises an actuator unit, which comprises a base and a carrier which is movable relative to the base and which carries an objective system, which positioning device further comprises a directing unit for directing a radiation beam emitted by the radiation source to the objective system.

2. Description of Related Art

Such a scanning device is known from EP-A 0 464 912. The known scanning device has a turntable for supporting, centering and rotating optical discs, particularly Compact Discs. Such discs have an information layer with a spiral track formed with a succession of pits, the information being stored in the track in digital form and the pits representing series of bits. The digital information on a Compact disc is covered by a transparent substrate having a nominal thickness of 1.2 mm. The scanning device further comprises an electro-optical scanning unit comprising an objective lens and an actuator for moving the lens. For optically scanning a disc a semiconductor-laser source is used, the beam of laser light being focused onto the information layer of the Compact Disc via the objective lens, the substrate being disposed between the objective lens and the information layer. Since the digital information on a Compact Disc is protected by a substrate possible flaws and dust particles are not situated in the focal plane of the light beam which scans the disc, so that they have comparatively little influence.

In order to set a correct focusing of the light beam the actuator comprises a stationary actuator section and a movable actuator section and comprises a drive combination of a coil and a permanent magnet for moving the objective lens parallel to its optical axis. During focusing the movable actuator section also performs translational movements about a central position. A focus servosystem provides the coil drive. The actuator is also capable of moving the objective lens in a direction transverse to its optical axis for the purpose of tracking.

In the course of time optical discs of various types, based on the "Compact Disc Standard", have been developed, such as CD-Audio, CD-ROM, CD-I and CD-R, which all have a substrate whose thickness complies with the value prescribed by this standard. Recently, a digital versatile disc (DVD) has been proposed, which comprises two transparent substrates between which one or more information layers are interposed. The substrates of said versatile disc each have a nominal thickness of 0.6 mm, i.e. half the substrate thickness of the Compact Discs. Furthermore, the bit length and the track pitch in the DVD differ from the corresponding parameters of the Compact Disc. Owing to these and still other differences the digital versatile disc, which is presented in various versions such as DVD-Audio, DVD-ROM, DVD-RAM and DVD-Video, cannot readily be scanned by means of the known scanning device.

SUMMARY OF THE INVENTION

It is an object of the invention to modify the known scanning device so as to obtain a device which enables optical discs whose substrate thicknesses and/or information densities differ substantially from one another to be scanned.

The scanning device in accordance with the invention is characterized in that the positioning device comprises two bodies which are movable relative to one another in planes oriented at least substantially transversely to the axis of rotation of the turntable, the base of the actuator unit being secured to one of said bodies and the directing unit being secured to the other body of said bodies, and the objective system comprises objective lenses disposed adjacent one another, each objective lens having an optical axis which extends at least substantially parallel to the axis of rotation of the turntable, and there have been provided latching means to latch said bodies relative to one another in latching positions, in each of which positions the directing unit is disposed opposite one of the objective lenses to direct the radiation beam to the respective objective lens along the optical axis of the respective objective lens.

The device in accordance with the invention makes it possible to read discs of two or more types, particularly discs whose transparent substrates differ from one another in that they have different nominal thicknesses and/or in that the information has been recorded in mutually different ways. The number of latching positions is generally equal to the desired number of types of disc to be scanned, the objective system being adapted to focus a radiation beam to a focal spot in an information plane of an optical disc in each of the latching positions. To proceed from one latching position to another latching position the directing unit and the entire actuator unit are moved relative to one another over a distance determined by the objective system.

By adapting each objective lens and/or its position to only one given type of optical disc, for example characterized by the substrate thickness and/or the information or recording density, the scanning device can be adapted simply to scan one given type of optical disc of a collection of two or more disc types. For this purpose it is merely required to select the appropriate latching position.

In a practical embodiment of the scanning device in accordance with the invention the directing unit is constructed as a deflector, such as a mirror unit having a mirror face. In a further practical embodiment the objective system comprises two objective lenses arranged adjacent one another, one of the objective lenses being selected to cooperate with a radiation source in each of the latching positions. If the directing unit takes the form of a deflector, the deflector is optically interposed between the radiation source and the selected objective lens. The radiation source can be a stationarily mounted radiation source, for example a laser source.

A practical embodiment of the scanning device in accordance with the invention comprising two objective lenses arranged adjacent one another is adapted to read and/or inscribe a type of optical disc in compliance with the CD Standard and a type of optical disc in compliance with the DVD standard.

In the case of an appropriate choice and position of the objective lenses in the actuator unit the known actuator unit as used in the known scanning device basically has to comply with hardly any additional requirements. The actuator unit in the scanning device in accordance with the invention in principle differs from the actuator unit known from EP-A 0 464 912 by the presence of two objective lenses instead of one objective lens, in which case the different optical properties of the objective lenses and the position of the objective lenses relative to one another, viewed in the direction of the optical axis, are of importance.

It is to be noted that EP-A 0 727 776 discloses a scanning device using an actuator with a stationary actuator section and a pivotable actuator section carrying two objective lenses. The last-mentioned actuator section is pivotable about a bearing pin through a comparatively large angle relative to the other section in order to bring either the one or the other objective lens into an operating position. In each of the operating positions the pivotable actuator section further performs small pivotal movements about the bearing pin during tracking and small translations along the bearing pin during focusing. In view of the necessity for the pivotable section to be capable of performing both large and small pivotal movements specific drive means are used in the form of additional coils and/or magnets. Such a measure leads to additional electronic control devices and additional mass and volume of the construction, which is unfavourable for the efficiency of the device. Moreover, two accurately defined zero positions of the pivotable actuator section are required in order to ensure an accurate scanning of each of the optical discs for which the scanning device is suited. In the known device the zero positions are obtained by means of magnetic holding forces, which define preferential positions for the pivotable section. However, the zero positions thus obtained are not readily reproducible in an accurate manner owing to influences such as temperature variations and inhomogeneities of the prevailing magnetic fields.

An embodiment of the scanning unit in accordance with the invention is characterized in that the latching means comprise a first stop element disposed on one of the bodies and a second stop element disposed on the other body, the two stop elements cooperating with one another in the latching positions during operation.

An embodiment of the scanning unit in accordance with the invention is characterized in that the stop elements are mechanical elements which are mechanically coupled to one another in the latching positions. In addition to the aforementioned advantages these elements have the further advantage of reduced wear. Moreover, the force required for the actuation can be smaller than in the case that mechanical elements not used.

An embodiment of the scanning unit in accordance with the invention is characterized in that the stop elements are magnetic or electromagnetic elements which are coupled to one another magnetically or electromagnetically, respectively.

An embodiment of the scanning unit in accordance with the invention is characterized in that there is provided actuating means for moving the two bodies relative to one another between the latching positions.

An embodiment of the scanning unit in accordance with the invention is characterized in that the actuating means comprise at least a first stop element disposed on one of the bodies and at least a stationary second stop element, the first stop element being engageable with the second stop element during operation of the positioning device in order to produce a movement of the bodies relative to one another from one latching position to another latching position. As a result of the presence of stop elements the movement can be effected by means of the drive device for moving the positioning device, the driving device being present anyway.

An embodiment of the scanning unit in accordance with the invention is characterized in that the actuating means comprise an electromagnetic driving device.

An embodiment of the scanning unit in accordance with the invention is characterized in that one of the bodies takes the form of a first slide supported in a frame, wherein the first slide can be translated along a first translation axis and the second body takes the form of second slide supported on the first slide, wherein, the second slide can be translated along a second translation axis, at least one of said axes extending at least substantially parallel to a perpendicular connecting line between the optical axes of the objective lenses. Such a construction is practical and simple to realize. For reasons of cost the second slide can be supported in the first slide. If more stringent requirements are imposed on the support of the second slide the embodiment in which the second slide is supported independently of the first slide is to be preferred.

A practical embodiment of the scanning unit in accordance with the invention is characterized in that the first translation axis and the second translation axis extend at least substantially parallel to one another. For given uses it may be desirable to opt for two translation axes which are not parallel to one another. For example, the first translation axis and the second translation axis may intersect one another at least substantially perpendicularly.

An embodiment of the scanning unit in accordance with the invention is characterized in that one of the bodies takes the form of a pivotal element which is pivotable about a pivotal axis parallel to the axis of rotation of the turntable, the other body being supported with respect to the pivotal element and being movable relative to the pivotal element along a line which extends at least substantially parallel to a perpendicular connecting line between the optical axes of the objective lenses. In this embodiment a simple yet accurate mounting of the actuator unit is achieved by means which are known per se. The pivotal element can be constructed as a pivotal arm.

An embodiment of the scanning unit in accordance with the invention is characterized in that the base of the actuator unit is secured to the pivotal element and the directing unit is secured to the other body. The other body can also be a pivotal element but is preferably constructed as a slide.

An embodiment of the scanning unit in accordance with the invention is characterized in that the directing unit comprises a deflector. The deflector can be, for example, a mirror or a prism.

The invention further relates to an optical player comprising the scanning device in accordance with the invention accommodated in a housing.

The invention further relates to a system comprising optical discs of a first type and optical discs of a second type, each of said discs having an optically transparent substrate and an optically scannable information layer on said substrate, and the scanning device in accordance with the invention. The difference between discs of the first type and discs of the second type mainly resides in the difference in thickness of the substrate and/or density of the information in the information layer. In a practical embodiment the first type comprises CDs and the second type comprises DVDs.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
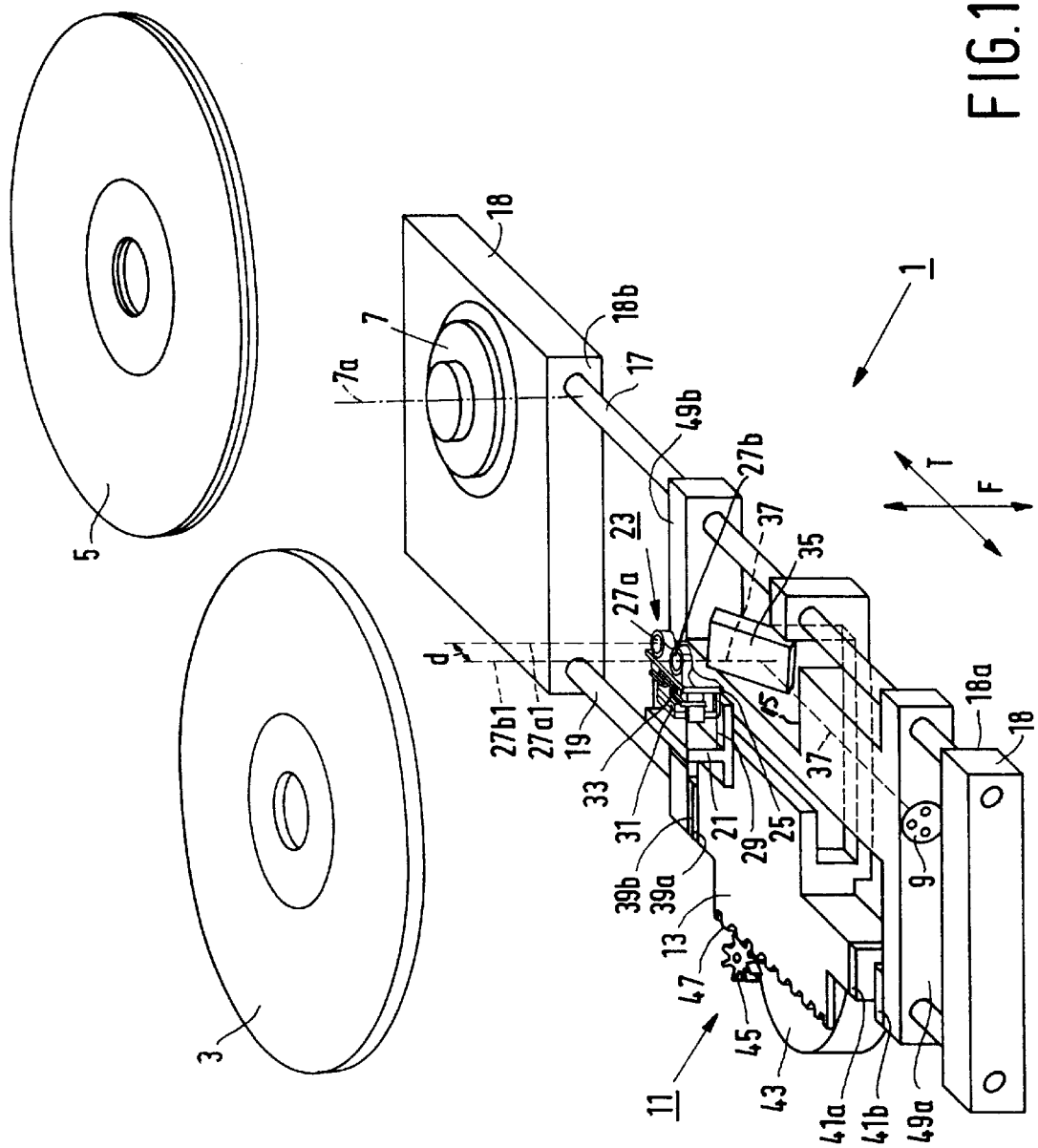
FIG. 1 is a diagrammatic perspective view showing an embodiment of the system in accordance with the invention.

The system in accordance with the invention shown in FIG. 1 comprises optical discs of a first type, optical discs of a second type, and a scanning device 1 in accordance with the invention. The optical discs of the first type are CDs, of which an optical disc 3 is shown, and the optical discs of the second type are DVDs. Of the last-mentioned type an optical disc 5 is shown. The scanning device 1 comprises a turntable 7, which is rotatable about an axis of rotation 7a, for supporting a disc-shaped recording medium, i.e. one of the afore-mentioned optical discs 3 and 5, respectively. The scanning device 1 further comprises a radiation source, particularly a semiconductor laser 9, and a positioning device 11. The positioning device 11 comprises two bodies 13 and 15 which are movable relative to one another and which are each constructed as a slide 13 and 15, respectively. The two slides 13 and 15 can be translated along guide means in a radial or at least substantially radial direction with respect to the turntable 7. In the present example the guide means comprises two slide bars 17 and 19, which are secured in a frame 18 and which extend through bearings, not shown, of the slides 13 and 15. An electromagnetic actuator 23 has a base 21 secured to the slide 13. The actuator 23 has a carrier 25, which is movable relative to the base 21 and which carries an objective system comprising two objective lenses 27a and 27b. The lenses 27a and 27b, which are disposed in line with one another viewed in a direction parallel to the slide bars 17 and 19, have an optical axis, 27a1 and 27b1, respectively, which extends parallel to the axias of rotation 7a of the turntable 7. The carrier 25 is secured to the base 21 via a hingeable or flexible suspension, so that the objective lenses 27a and 27b are movable both in a focusing direction (indicated by an arrow F) and in a tracking direction (indicated by an arrow T). A coil system 33 has been provided in order to drive the carrier 25. EP-A 464,912 (herewith incorporated by reference) describes an example of the suspension of the carrier 25 and the magnetic circuit 31 with the coil system 33.

A directing unit 35, in the present example a plane mirror, is secured to the slide 15 and serves to direct a radiation beam 37 emitted by the radiation source 9 to one of the objective lenses 27a or 27b.

The scanning device 1 in accordance with the invention comprises latching means for latching the slides 13 and 15 relative to one another in two accurately defined latching positions. These latching positions are determined by those relative positions of the lens system 27a, 27b and the directing unit 35, in which the radiation beam 37 produced by the radiation source 9 passes through the objective lens 27a or the objective lens 27b after it has been directed. In FIG. 1 the slides 13 and 15 are shown in a latching position relative to one another, in which the radiation beam is oriented along the optical axis 27b1 of the objective lens 27b after having traversed the directing unit 35. In the other latching position, in which with respect to the latching position shown the slides 13 and 15 have been moved over a distance equal to the distance between the optical axes 27a1 and 27b1, in which the radiation beam is oriented along the optical axis 27a1 after reflection by the directing unit 35. In the present example said latching means comprise two pairs of magnetic elements 39a, 39b and 41a, 41b, facing surfaces of each pair of elements being oppositely polarized, so that the slides 13 and 15 are magnetically coupled to one another in each of the latching positions. In the latching position shown this is effected by means of the elements 39a and 39b; in the other latching position by means of the elements 41a and 41b.

The scanning device 1 in accordance with the invention comprises a driving device for moving the slides 13 and 15 along the guide means 17, 19. This driving device comprises an electric motor 43 secured to the frame 18 and a transmission unit comprising a pinion 45. The pinion 45 meshes with a toothed rack 47 arranged on the slide 13. When the electric motor is energized the two slides 13 and 15 are simultaneously moved over the same distance, i.e. insofar as the movements are within the operating range of the positioning device, owing to their coupling via the elements 39a, 39b and 41a, 41b, respectively. In the present example this operating range is radially limited by two frame portions 18a and 18b of the frame 18.

The scanning device 1 in accordance with the invention comprises actuating means for moving the slides 13 and 15 relative to one another between said two latching positions. In addition to said driving device 43, 45 these actuating means comprise two first stop elements 49a and 49b forming part of the slide 15 and two second slide elements formed by the frame portions 18a and 18b. If upon energization of the electric motor 43 the two slides 13 and 15 are moved along the slide bars 17 and 19 from the position shown in a radial direction away from the turntable 7 the first stop element 49a will abut against the second stop element 18a at a given instant, as a result of which the slide 15 is halted. Since in this case the slide 13 is still driven and the driving force is larger than the magnetic holding force between the magnetic elements 39a and 39b, the slide 13 is moved further over a distance d until the latching position is reached in which the magnetic elements 41a and 41b establish the coupling between the slides 13 and 15.

Figure 2:
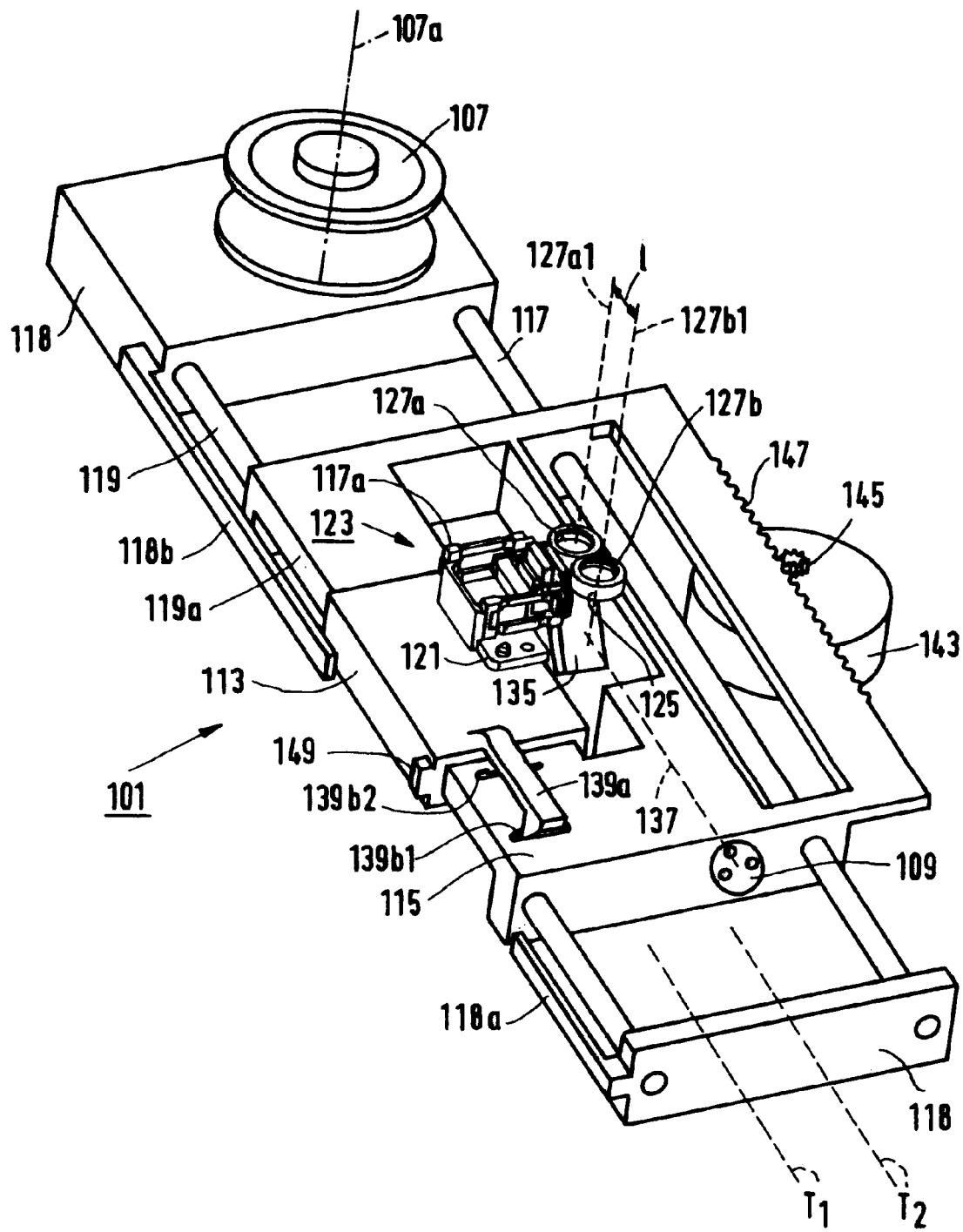
FIG. 2 is a diagrammatic perspective view showing an embodiment of the scanning device in accordance with the invention.

The scanning device 101 in accordance with the invention shown in FIG. 2 comprises a turntable 107, which is rotatable about an axis of rotation 107a, for supporting disc-shaped recording media which may differ with respect to their substrate thickness and/or information density. The scanning device 101 further comprises a radiation source 109 and a positioning device which is operable with respect to the turntable 107 in a plane which is oriented at least substantially transversely to the axis of rotation 107a. The movable positioning device comprises an actuator unit 123 having a base 121 and a carrier 125, which is movable relative to the base 121 and which carries an objective system. The positioning device further comprises a directing unit 135 in the form of a deflector, particularly a mirror, for directing a radiation beam 137 generated by the radiation source to the objective system. The positioning device comprises two bodies in the form of slides 113 and 115 which are movable relative to one another in planes which are oriented at least substantially transversely to the axis of rotation 107a of the turntable 107, the base 121 of the actuator unit 123 being secured to one of the bodies, in the present example the slide 113. The directing unit 135 is secured to the other body, i.e. to the slide 115. The objective system comprises two objective lenses arranged adjacent one another, in the present example the objective lenses 127a and 127b, each of the objective lenses having an optical axis, 127a1 and 127b1, respectively, which extends at least substantially parallel to the axis of rotation 107a of the turntable 107.

For further information about the construction of the actuator unit, apart from the objective system which is used, reference is made to EP-A 464,912.

The scanning device 101 has a driving device comprising an electric motor 143 with a pinion 145, which is in mesh with a toothed rack 147 of the slide 115. The slide 115 can be translated along guide means 117, 119 comprising two slide bars 117 and 119. The slide 113 can be translated to a limited extent with respect to the slide 115, guiding being achieved by means of guide edges 117a and 119a of the slide 115. Since the slide bars 117 and 119 extend in an at least substantially radial direction with respect to the turntable 107 and the guide edges 117a and 119a extend parallel to the slide bars 117 and 119, the slides 113 and 115 can be translated along a first translation axis T1 and a second translation axis T2, respectively, which extend in at least substantially radial directions. Moreover, both axes T1 and T2 extend at least substantially parallel to a perpendicular connecting line 1 between the optical axes 127a1 and 127b1 of the objective lenses 127a and 127b.

The scanning device 101 comprises latching means for latching the slides 113 and 115 relative to one another in latching positions defined in such manner that in these positions the directing unit 135 is disposed opposite one of the objective lenses 127a or 127b to orient the radiation beam 137 along the respective optical axis 127a1 or 127b1. The latching means comprise a first mechanical stop element in the form of a resilient latching hook 139a disposed on the slide 113 and a second stop element in the form of two latching recesses 139b1 and 139b2.

In the latching position shown in FIG. 2, in which the directing unit 135 directs the radiation beam 137 along the optical axis 127b1 of the objective lens 127b, the hook 139a engages in the recess 139b1. In the other latching position, not shown, in which the directing unit 135 directs the radiation beam 137 along the optical axis 127a1 of the objective lens 127a, the hook 139a engages in the recess 139b2. In both cases the slides 113 and 115 are locked against movement relative to one another during scanning of a recording medium disposed on the turntable 107.

The scanning device 101 comprises actuating means for moving the two slides 113 and 115 relative to one another between the latching positions. These actuating means comprise a first stop element 149 disposed on the slide 113 and two stationary second stop elements 118a and 118b. The first stop element 149 takes the form of a projection and the second stop elements 118a and 118b, which are each secured to a frame 118, are both rod-shaped. The first stop element 149 is positioned in such a manner relative to the second stop element 118a and 118b, that during scanning the slides 113 and 115 can together move in a radial direction without the stop element 149 coming into contact with a stop element 118a or 118b. However, when the slides are together moved to a far radially outward or inward position, the stop element 149 comes into contact with the respective stop element 118a or 118b. If such an outward displacement takes place from the latching position shown, the driven slide 115 will perform a small travel after the stop element 149 has come into contact with the stop element 118a, the latching hook 139a being disengaged from the latching recess 136b1 and engaging the latching recess 139b2 to couple the slides 113 and 115 to one another in the other latching position.

Figure 3:
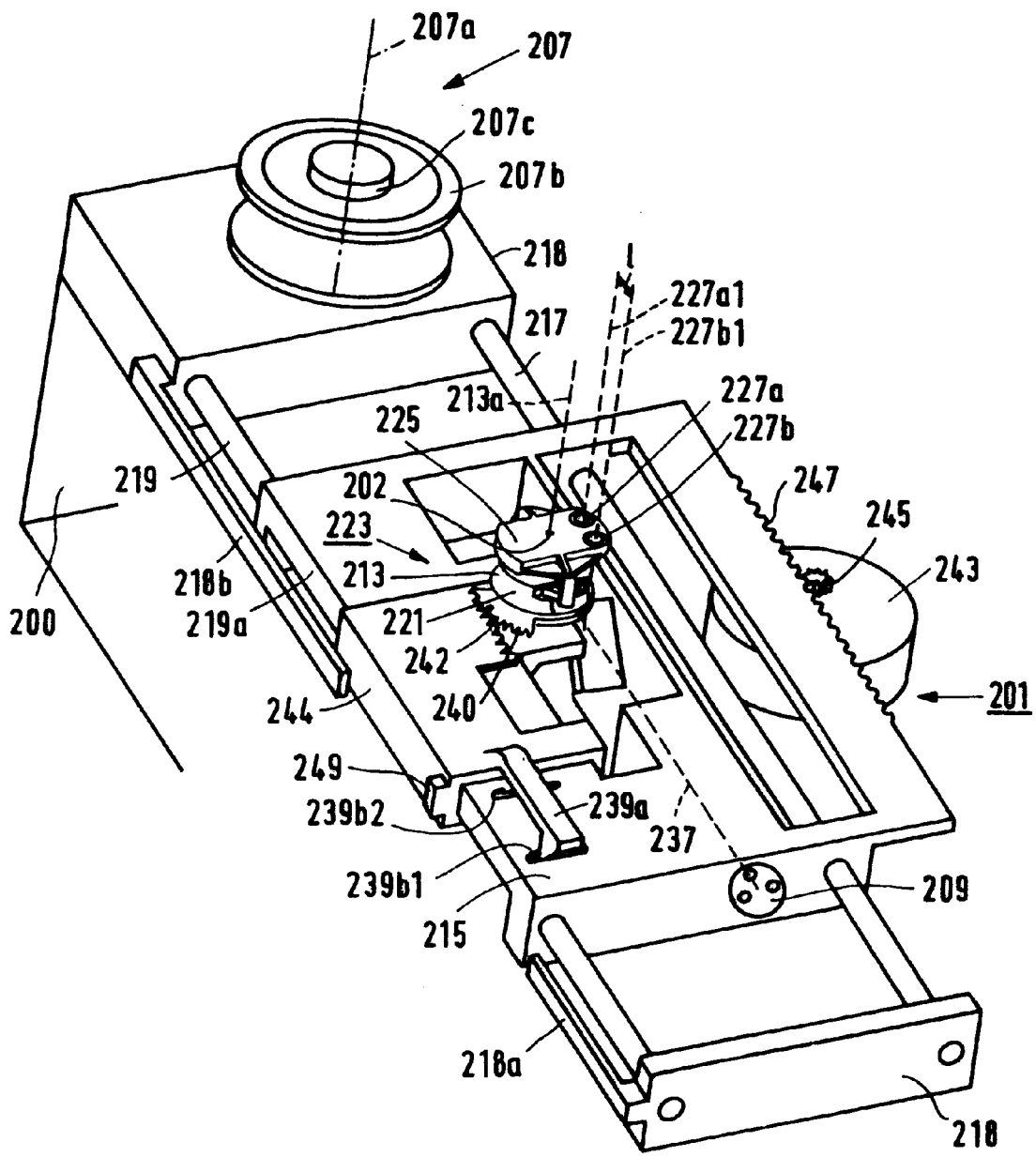
FIG. 3 is a diagrammatic perspective view showing an embodiment of the optical player in accordance with the invention.

The optical player in accordance with the invention shown in FIG. 3 comprises a scanning device 201 accommodated in a housing 200. The scanning device 201 is suitable for scanning optical discs which differ from one another, particularly in respect of their transparent substrates and information densities. The scanning device 201 comprises a turntable 207, which is supported in a frame 218 and which has a supporting surface 207b and a centering portion 207c for an optical disc. The frame 218 is secured to the housing 200, at option in a resilient and/or damping manner, and the turntable 207 is rotatable about an axis of rotation 207a. The scanning device 201 further comprises a radiation source 209 and a positioning device which is operable in a plane oriented transversely to the axis of rotation, which positioning device comprises an actuator unit 223, which comprises a base 221 and a carrier 225, which is movable relative to the base 221 and which carries an objective system comprising two objective lenses 227a and 227b. Said positioning device further comprises a directing unit 235 for directing a radiation beam 237 emitted by the radiation source to the objective system. Said positioning device comprises two bodies, i.e. a pivotal element 213 and a slide 115, which are movable relative to one another in planes which are oriented transversely to the axis of rotation 207a of the turntable 207. The pivotal element 213 is pivotable about a pivotal axis 213a parallel to the axis of rotation 207a of the turntable 207 and the slide 215 can be translated radially relative to the axis of rotation 207a of the turntable 207 along guide means 217, 219. Said directing unit 235 is secured to the slide 215, which in the present example can be driven by a driving device, which comprises an electric motor 243, via a pinion 245 and a toothed rack 247. The base 221 of said actuator unit 223 is secured to the pivotal element 213, which in the present example is pivotably mounted in the slide 215. Apart from the objective system 227a, 227b, the actuator unit 223 is of a type as described in detail in U.S. Pat. No. 4,817,076 (herewith incorporated by reference). The actuator unit 223 comprises a bearing pin 202 which extends parallel to the axis of rotation 207a of the turntable 207, the carrier 225 being capable of performing small rotary movements about the central axis of the bearing pin 202 for the purpose of tracking.

Furthermore, the carrier 225 is capable of performing small translational movements in the longitudinal direction of the bearing pin 202 for the purpose of focusing. The actuator unit further comprises a magnetic circuit having drive coils. The objective lenses 227a and 227b each have an optical axis 227a1 and 227b1, respectively, the perpendicular connecting line 1 between the optical axes 227a1 and 227b1 extending parallel to the guide means 217, 219 and consequently to the directions of translation of the slide 215b.

The pivotal element 213 carries a toothed segment 240, which is in mesh with a toothed rack 242 of an actuating member 244. In the present example the actuating member 244 is mounted in the slide 214 so as to be radially slidable between two positions, of which one position is shown in FIG. 3. In the shown position of the actuating member 244 the pivotal element 213 and the slide 215 are in a position in which they are latched to one another, i.e. in that latching position in which the directing unit 235 directs the radiation beam 237 to the objective lens 227b. The actuating member 244 is latched relative to the slide 215 by means of a resilient latching hook 239a, which engages a latching recess 239b1.

As a result of the movement of the actuating member 244 from the position shown towards the turntable 207 a pivotal movement is imparted to the pivotal element 213 and hence to the actuator unit 223. A new latching position of the pivotal element 213 and the slide 215 is reached if the latching hook 239a engages the latching recess 239b2. In this latching position the directing unit 235 directs the radiation beam 237 to the objective lens 227a. The movement of the actuating member 244 is generated from a movement of the slide 215, 149, for which the actuating means 218a, 218b and 249 play an important role. At a given instant during a movement of the slide 215 from the position shown in FIG. 3 to a position farther away from the turntable, the projection 249 of the actuating member 244 will be retained by the stationary stop 218a. As the movement of the slide 215 proceeds the actuating member 244 is moved relative to the slide 215, the latching hook 239a eventually engaging the latching recess 239b2. When the slide 215 moves towards the turntable 207 starting from the situation now obtained, the latching position shown can be obtained again through cooperation between the projection 249 and the stationary stop 218b.

Obviously, the optical player in accordance with the invention further comprises the necessary optical and electronic components, which are known per se.

It is to be noted that the invention is not limited to the embodiments shown herein. For example, the slide in the example shown in FIG. 3 can be constructed as a pivotal member. Moreover, the pivotal element in the example shown in FIG. 3 need not necessarily be supported in the slide. Furthermore, the stop means and/or the actuating means can be constructed in another manner than shown.

What is claimed is:

1. A scanning device comprising:
   a turntable for rotating a disc-shaped recording medium about an axis of rotation;
   a radiation source; and
   a positioning device which is operable with respect to the turntable in a plane substantially transverse to said axis of rotation and which includes:
     an actuator unit having a base and a carrier which is moveable relative to the base and which carries several different objective lenses;
     a directing unit for directing a radiation beam emitted by the radiation source to one of the objective lenses; and
     two supporting bodies which are moveable relative to each other in a radial direction substantially transverse to said axis of rotation;
   characterized in that:
     the base of the actuator unit is secured to one of the supporting bodies and the directing unit is secured to the other of the supporting bodies;
     the objective lenses are disposed adjacent each another in said radial direction and have optical axes extending substantially parallel to said axis of rotation, each of said lenses being for focusing on an information plane of a respective one of several different types of recording media; and
   the scanning device further comprises
     latching means to latch the supporting bodies relative to each other in any of several different latching positions in which the directing unit is disposed opposite a respective one of the objective lenses to direct the radiation beam to that respective lens along the optical axis thereof; and
     actuating means for moving the two supporting bodies relative to each other between the latching positions, said actuating means including a first stop element disposed on one of the supporting bodies and a stationary second stop element, the first stop element being engageable with the second stop element during movement of the supporting bodies relative to each other from one latching position to another latching position,
   in which:
     one of the supporting bodies is in the form of a pivotal element which is pivotal about an axis parallel to said axis of rotation, and the second supporting body is supported with respect to the pivotal element and moveable relative thereto along a line extending substantially parallel to a perpendicular connecting line between the optical axes of the objective lenses.

2. A scanning device as claimed in claim 1, in which the base of the actuator unit is secured to the pivotal element and the directing unit is secured to the second supporting body.

3. A scanning device as claimed in claim 1, in which the stop elements of said actuating means are mechanical elements which are mechanically coupled to one another in the latching positions.

4. A scanning device as claimed in claim 1, in which the stop elements are magnetic or electromagnetic elements which are coupled to one another magnetically or electromagnetically, respectively, in the latching positions.

5. A scanning device as claimed in claim 1, in which the actuating means include an electromagnetic driving device.

6. A scanning device comprising:
   a turntable for rotating a disc-shaped recording medium about an axis of rotation;
   a radiation source; and
   a positioning device which is operable with respect to the turntable in a plane substantially transverse to said axis of rotation and which includes:
     an actuator unit having a base and a carrier which is moveable relative to the base and which carries several different objective lenses;
     a directing unit for directing a radiation beam emitted by the radiation source to one of the objective lenses; and
     two supporting bodies which are moveable relative to each other in a radial direction substantially transverse to said axis of rotation;
   characterized in that:
     the base of the actuator unit is secured to one of the supporting bodies and the directing unit is secured to the other of the supporting bodies;
     the objective lenses are disposed adjacent each another in said radial direction and have optical axes extending substantially parallel to said axis of rotation, each of said lenses being for focusing on an information plane of a respective one of several different types of recording media; and
   the scanning device further comprises
     latching means to latch the supporting bodies relative to each other in any of several different latching positions in which the directing unit is disposed opposite a respective one of the objective lenses to direct the radiation beam to that respective lens along the optical axis thereof; and
     actuating means for moving the two supporting bodies relative to each other between the latching positions in said radial direction and for moving the two supporting bodies relative to the axis of rotation in said radial direction, said actuating means including a first stop element disposed on one of the supporting bodies and a stationary second stop element, the first stop element being engageable with the second stop element during movement of the supporting bodies relative to each other from one latching position to another latching position.

7. A scanning device as claimed in claim 6, in which the stop elements of said actuating means are mechanical elements which are mechanically coupled to one another in the latching positions.

8. A scanning device as claimed in claim 6, in which the stop elements are magnetic or electromagnetic elements which are coupled to one another magnetically or electromagnetically, respectively, in the latching positions.

9. A scanning device as claimed in claim 6, in which the actuating means include an electromagnetic driving device.

10. A scanning device as claimed in claim 6, in which one of the supporting bodies is in the form of a first slide supported in a frame of said device and is translatable along a first translation axis and the second supporting body is in the form of a second slide supported on the first slide and is translatable along a second translation axis, at least one of the translation axes extending substantially parallel to a perpendicular connecting line between the optical axes of the objective lenses.

11. A scanning device as claimed in claim 10, in which the first translation axis and the second translation axis extend substantially parallel to one another.

* * * * *